(12) United States Patent
Seo et al.

(10) Patent No.: US 11,418,361 B2
(45) Date of Patent: Aug. 16, 2022

(54) MASTER DEVICE, SYSTEM AND METHOD OF CONTROLLING THE SAME

(71) Applicant: Samsung Electronics Co., Ltd., Suwon-si (KR)

(72) Inventors: Boeok Seo, Suwon-si (KR); Seonbong Kim, Suwon-si (KR); Hojun Shim, Yongin-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 162 days.

(21) Appl. No.: 16/816,992

(22) Filed: Mar. 12, 2020

(65) Prior Publication Data

US 2021/0028956 A1 Jan. 28, 2021

(30) Foreign Application Priority Data

Jul. 25, 2019 (KR) .................. 10-2019-0090170

(51) Int. Cl.
*H04L 12/40* (2006.01)
*H04L 45/302* (2022.01)
*H04L 41/5019* (2022.01)
*H04L 67/1097* (2022.01)

(52) U.S. Cl.
CPC .. *H04L 12/40019* (2013.01); *H04L 12/40039* (2013.01); *H04L 41/5019* (2013.01); *H04L 45/302* (2013.01); *H04L 67/1097* (2013.01)

(58) Field of Classification Search
CPC ......... H04L 12/40039; H04L 12/40019; H04L 12/403; H04L 41/5009; H04L 41/5019; H04L 43/0852; H04L 45/302; H04L 67/1097; H04L 45/123; G06F 1/3206; G06F 1/324; G06F 1/3278; G06F 1/3296; H04W 40/10; H04W 40/125; H04W 52/48; Y02D 10/126; Y02D 10/157; Y02D 10/172; Y02D 10/00; Y02D 70/326; Y02D 70/34; Y02D 30/70
See application file for complete search history.

(56) References Cited

U.S. PATENT DOCUMENTS

| | | | | |
|---|---|---|---|---|
| 6,504,823 B1 * | 1/2003 | Nakajima | ........... | H04L 12/2805 370/241 |
| 6,956,401 B1 * | 10/2005 | Tyhach | ............ | H03K 17/04106 326/80 |
| 8,155,712 B2 * | 4/2012 | Gilb | .................... | H04W 52/287 455/574 |
| 8,201,172 B1 * | 6/2012 | Oliveira | .................. | H04L 49/90 718/102 |

(Continued)

*Primary Examiner* — Dung B Huynh

(74) *Attorney, Agent, or Firm* — Harness, Dickey & Pierce, P.L.C.

(57) ABSTRACT

A method of controlling a master device includes, providing a measured service level by measuring a service level with respect to requests of a master device that is connected to a slave device through an interconnect device and generates the request to demand services from the slave device and controlling a power level of a request control circuit included in the master device based on the measured service level. Power consumption of the master device and the system including the master device is reduced without performance degradation by controlling the power level of the request control circuit adaptively based on the measured service level.

18 Claims, 13 Drawing Sheets

(56) References Cited

U.S. PATENT DOCUMENTS

| | | | | |
|---|---|---|---|---|
| 8,255,562 | B2* | 8/2012 | Rickard | G06F 11/3419 709/233 |
| 8,972,689 | B1* | 3/2015 | de la Iglesia | G06F 3/0611 711/168 |
| 9,152,213 | B2 | 10/2015 | Yun et al. | |
| 9,158,461 | B1* | 10/2015 | Lee | G06F 3/0611 |
| 9,298,210 | B2 | 3/2016 | Aoki | |
| 9,395,795 | B2 | 7/2016 | Warren et al. | |
| 9,442,668 | B1 | 9/2016 | Adams | |
| 9,887,918 | B1* | 2/2018 | Stark | H04L 49/90 |
| 10,206,175 | B2 | 2/2019 | Fukami et al. | |
| 2004/0068615 | A1* | 4/2004 | Chaudhari | G06F 13/16 711/137 |
| 2004/0081197 | A1* | 4/2004 | Liu | H04L 45/04 370/468 |
| 2004/0252577 | A1* | 12/2004 | Kwak | G11C 11/4087 365/232 |
| 2005/0246340 | A1* | 11/2005 | Smith | G06F 13/362 |
| 2007/0053375 | A1* | 3/2007 | Kurosawa | H04L 12/403 370/450 |
| 2009/0052585 | A1* | 2/2009 | Song | H04L 1/0065 375/340 |
| 2009/0077455 | A1* | 3/2009 | Mizutani | H04L 1/0083 714/807 |
| 2009/0177858 | A1* | 7/2009 | Gschwind | G06F 1/3275 711/163 |
| 2009/0234989 | A1* | 9/2009 | Fischer | G06F 1/3203 710/56 |
| 2010/0031075 | A1* | 2/2010 | Kapil | G06F 1/3225 713/340 |
| 2010/0112955 | A1* | 5/2010 | Krishnaswamy | H04L 67/104 455/67.11 |
| 2010/0131610 | A1* | 5/2010 | Furtner | H04L 29/12801 709/208 |
| 2010/0198936 | A1* | 8/2010 | Burchard | G06F 13/1673 709/212 |
| 2010/0231282 | A1* | 9/2010 | Singasani | G06F 30/327 327/297 |
| 2010/0262763 | A1* | 10/2010 | Liu | G06F 11/1048 710/22 |
| 2010/0275049 | A1* | 10/2010 | Balakrishnan | G06F 12/0846 713/324 |
| 2011/0058564 | A1* | 3/2011 | Sugawara | H04L 49/10 370/401 |
| 2011/0173352 | A1* | 7/2011 | Sela | G06F 1/3253 710/16 |
| 2011/0255590 | A1* | 10/2011 | Kim | H04N 1/33323 375/240.01 |
| 2011/0258354 | A1* | 10/2011 | Wang | G06F 13/161 710/114 |
| 2012/0102293 | A1* | 4/2012 | Negishi | G06F 13/1626 711/200 |
| 2012/0198171 | A1* | 8/2012 | Chachad | H03K 21/00 711/128 |
| 2012/0203942 | A1* | 8/2012 | Yonemoto | H03H 17/02 710/53 |
| 2012/0213075 | A1* | 8/2012 | Koie | H04L 47/2441 370/235 |
| 2012/0226826 | A1* | 9/2012 | Henriksson | H04L 47/2441 709/250 |
| 2013/0061076 | A1* | 3/2013 | VerSteeg | H04N 21/23106 713/321 |
| 2013/0076903 | A1* | 3/2013 | Quinn | H04N 7/181 348/148 |
| 2013/0151877 | A1* | 6/2013 | Kadri | G06F 1/3296 713/320 |
| 2013/0195210 | A1* | 8/2013 | Swarbrick | H04L 25/02 375/259 |
| 2013/0262569 | A1* | 10/2013 | Ahn | H04L 67/02 709/203 |
| 2013/0268706 | A1* | 10/2013 | Yun | G06F 13/364 710/110 |
| 2014/0022853 | A1* | 1/2014 | Choi | G11C 11/5642 365/189.05 |
| 2014/0052906 | A1* | 2/2014 | Thyagarajan | G06F 13/161 711/105 |
| 2014/0078918 | A1* | 3/2014 | Han | H04L 12/12 370/252 |
| 2014/0082268 | A1* | 3/2014 | Kim | G06F 3/061 711/103 |
| 2014/0121787 | A1* | 5/2014 | Yamazaki | G05B 15/02 700/19 |
| 2014/0177470 | A1* | 6/2014 | Roitshtein | H04L 49/00 370/254 |
| 2014/0223053 | A1* | 8/2014 | Yoshida | G06F 13/1689 710/110 |
| 2015/0100617 | A1* | 4/2015 | Diederich | H04L 67/325 709/201 |
| 2015/0180784 | A1* | 6/2015 | Tokutsu | H04L 12/4015 370/429 |
| 2015/0254005 | A1* | 9/2015 | Calvert | G06F 3/0613 711/103 |
| 2015/0312867 | A1* | 10/2015 | Cui | H04W 52/0206 455/68 |
| 2015/0362975 | A1* | 12/2015 | Solihin | G06F 1/3206 713/320 |
| 2015/0363116 | A1 | 12/2015 | Govindan et al. | |
| 2016/0062930 | A1* | 3/2016 | Kijima | G06F 13/364 710/110 |
| 2016/0111950 | A1* | 4/2016 | Duncan | H04W 52/0274 323/268 |
| 2016/0139849 | A1* | 5/2016 | Chaw | G06F 3/0611 711/119 |
| 2016/0226712 | A1* | 8/2016 | Palmer | H04L 45/02 |
| 2016/0259394 | A1* | 9/2016 | Ragavan | H04L 49/00 |
| 2016/0283116 | A1* | 9/2016 | Ramalingam | G06F 3/0688 |
| 2017/0310742 | A1* | 10/2017 | Jain | H04L 67/34 |
| 2018/0039554 | A1* | 2/2018 | Wang | G11C 29/56 |
| 2018/0052785 | A1 | 2/2018 | Suh et al. | |
| 2018/0062692 | A1* | 3/2018 | Huh | G06F 13/4282 |
| 2019/0018814 | A1* | 1/2019 | Ma | G06F 13/4282 |
| 2019/0065243 | A1* | 2/2019 | Eckert | G06F 3/0659 |
| 2019/0108861 | A1 | 4/2019 | Tsien et al. | |
| 2019/0371373 | A1* | 12/2019 | Haldar | G11C 7/222 |
| 2020/0020384 | A1* | 1/2020 | Zhao | G06F 13/1642 |
| 2020/0042500 | A1* | 2/2020 | Li | G06F 3/061 |
| 2020/0045110 | A1* | 2/2020 | Varnica | G06F 16/9035 |
| 2020/0174548 | A1* | 6/2020 | Chung | G06F 13/4027 |
| 2020/0334979 | A1* | 10/2020 | Gonçalves | G08G 1/0129 |
| 2020/0341536 | A1* | 10/2020 | Waugh | G06F 1/28 |
| 2021/0291803 | A1* | 9/2021 | Gesang | B60L 15/2045 |
| 2021/0391922 | A1* | 12/2021 | Geng | H04B 10/0795 |

* cited by examiner

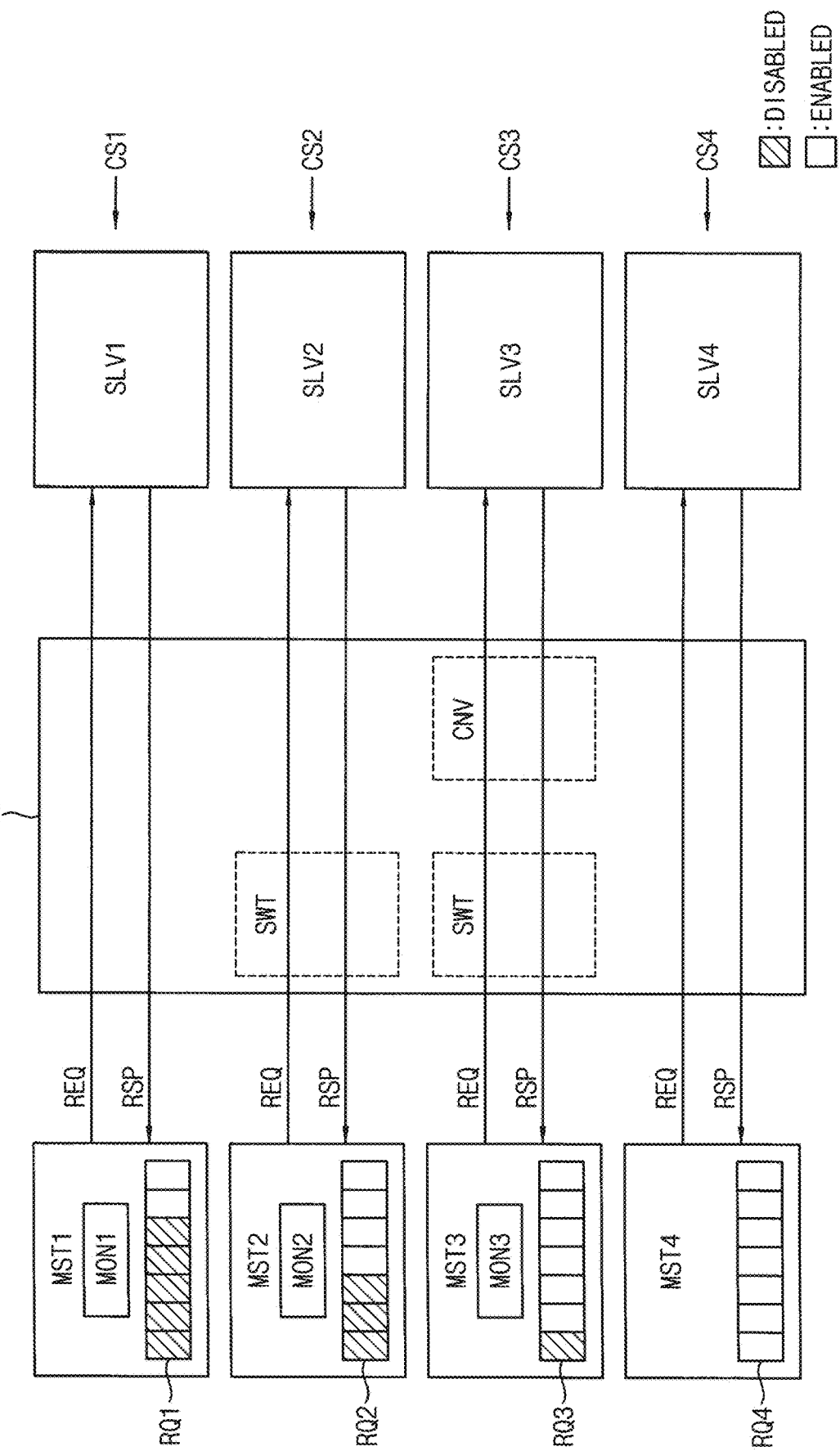

MASTER DEVICE, SYSTEM AND METHOD OF CONTROLLING THE SAME

CROSS-REFERENCE TO RELATED APPLICATION

This U.S. non-provisional application claims priority under 35 USC § 119 to Korean Patent Application No. 10-2019-0090170, filed on Jul. 25, 2019, in the Korean Intellectual Property Office (KIPO), the disclosure of which is incorporated by reference herein in its entirety.

BACKGROUND

1. Technical Field

Example embodiments relate generally to semiconductor integrated circuits. For example, at least some example embodiments relate to a master device, a system including the master device and/or a method of controlling the master device.

2. Discussion of the Related Art

A system-on-chip (SOC) indicates a chip or a system on the chip in which various semiconductor components are integrated as one chip. The recent market trend is away from application specific integrated circuits (ASICs) and application specific standard products (ASSPs), toward SOC technologies. Further, there is an increasing demand for reducing the size and increasing the performance level of the SOC. While the integration degree of the SOC may be increased by integrating additional components into one chip, an operational speed of the SOC may not increase sufficiently. As the number of integrated intellectual property (IP) devices and the operational speed of the SOC are increased, the power consumption of the SOC is increased.

SUMMARY

Some example embodiments may provide a master device, capable of reducing power consumption efficiently. Some example embodiments may provide a system including the master device and/or a method of controlling the master device, capable of reducing power consumption efficiently.

Some example embodiments are related to a method of controlling a master device configured to communicate with a slave device via an interconnect device, the method including measuring a service level with respect to requests from a request control circuit associated with the master device, the requests requesting services from the slave device; and controlling a power level of the request control circuit based on the service level.

Some example embodiments are related to a master device connected to a slave device through an interconnect device, the master device including processing circuitry configured to, transmit requests to the slave device requesting services from the slave device, measure a service level with respect to the requests of the master device, and control a power level associated with transmission of the requests based on the service level.

Some example embodiments are related to a system including at least one slave device; a plurality of master devices each configured to generate requests to demand services from the slave device, at least one of the plurality of master devices including processing circuitry configured to measure a service level of the requests of the at least one of the plurality of master devices, and to control a power level associated with transmission of the requests based on the service level; and an interconnect device coupled to the at least one slave device and the plurality of master devices through respective channels, the interconnect device configured to control request flows between the at least one slave device and the plurality of master devices.

The master device and the method of controlling the master device according to example embodiments may reduce the power consumption of the master device and the system including the master device without performance degradation by controlling the power level of the request control circuit adaptively based on the measured service level.

BRIEF DESCRIPTION OF THE DRAWINGS

Example embodiments of the present disclosure will be more clearly understood from the following detailed description taken in conjunction with the accompanying drawings.

FIGS. 5A and 5B are diagrams for describing an example embodiment of controlling a power level according to example embodiments.

DETAILED DESCRIPTION

Figure 1:
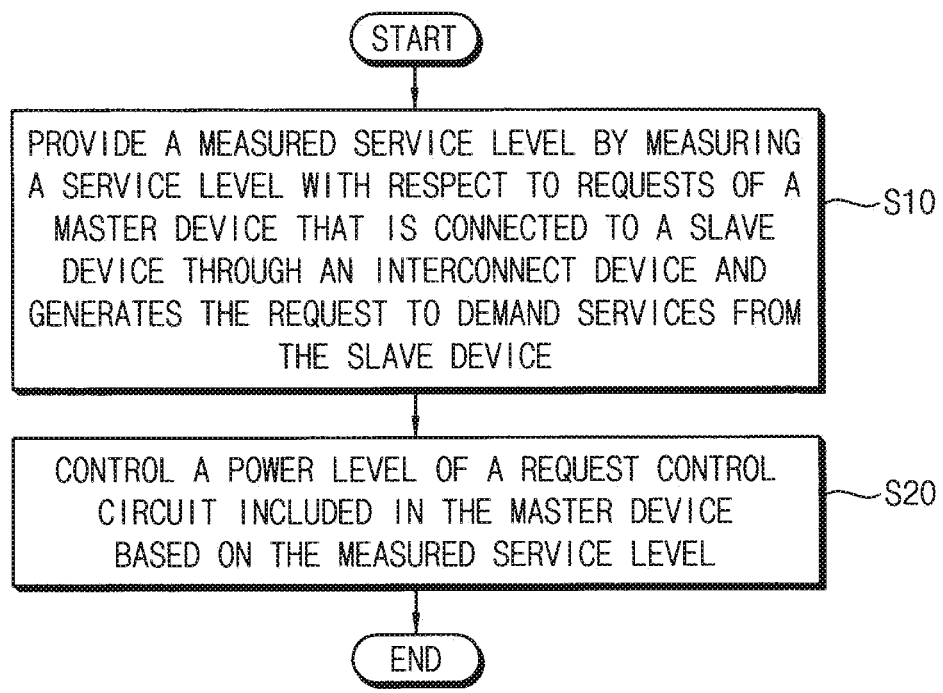
FIG. 1 is a flow chart illustrating a method of controlling a master device according to example embodiments.

Various example embodiments will be described more fully hereinafter with reference to the accompanying draw- FIG. 1 is a flow chart illustrating a method of controlling a master device according to example embodiments.

Referring to FIG. 1, in operation S100, a measured service level may be provided by measuring a service level with respect to requests of a master device. The master device may be connected to at least one slave device through an interconnect device and generates the request to demand services from the slave device.

In some example embodiments, as the measured service level, a measured latency may be provided by measuring a latency corresponding to a delay from when the master device issues the request for service to when the requested service is completed.

In other example embodiments, as the measured service level, a measured bandwidth may be provided by measuring a data amount that is serviced or transferred to the master device during a unit time.

In still other example embodiments, as the measured service level, both of the measured latency and the measured bandwidth.

In operation S20, a power level of a request control circuit included in the master device may be controlled based on the measured service level. The control of the power level may indicate controlling power consumption of the master device by controlling an operation clock signal and/or a power supply voltage provided to the request control circuit.

In some example embodiments, the power level of the master device may be controlled by changing a maximum number of outstanding requests that the master device can issue. The power consumption may be reduced by decreasing the maximum number of the outstanding requests as the measured service level increases.

In general, a dynamic voltage and frequency scaling (DVFS) scheme may be adopted to synthetically manage the performance and the power consumption of the master device. The DVFS scheme controls the power level of the master device by changing a frequency of the operation clock signal and/or a voltage level of the power supply voltage depending on the workload of the master device. According to the DVFS scheme, the performance of the master device may be lowered if the power level is decreased to reduce the power consumption of the master device.

In contrast, the master device and the method of controlling a master device according to example embodiments may control only the power level of the request control circuit regardless of the frequency of the operation clock signal and the voltage level of the power supply voltage. Accordingly, the power consumption of the master device may be reduced while the performance of the master device is not affected. According to example embodiments. When the service level of the master device is sufficiently high, the power level of the request control circuit may be reduced without affecting the performance of the master device.

As such, the method of controlling the master device according to example embodiments may reduce the power consumption of the master device and the system including the master device without performance degradation by controlling the power level of the request control circuit adaptively based on the measured service level.

Figure 2:
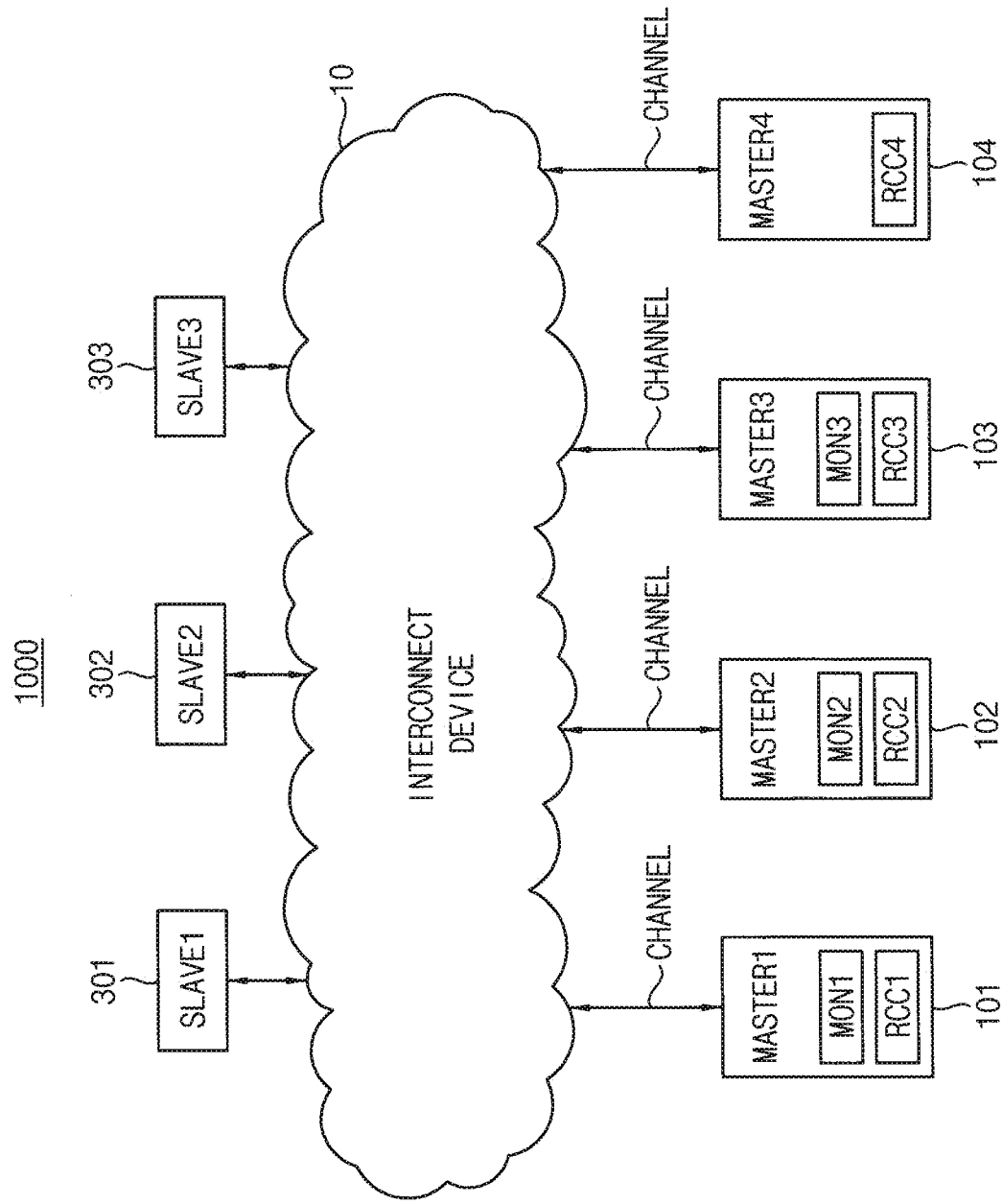
FIG. 2 is block diagram illustrating a system according to example embodiments.

FIG. 2 is block diagram illustrating a system according to example embodiments.

Hereinafter, a system may indicate an SOC in which various semiconductor components are integrated as one chip, but example embodiments are not limited to the SOC.

Referring to FIG. 2, a system 1000 may include master devices (MASTERi, i=1,2,3,4) 101, 102, 103 and 104, slave devices (SLAVEj, j=1,2,3) 301, 302 and 303, and an interconnect device 10.

The master device and the slave device may be referred to as an intellectual property (IP) device. The master device may be referred to as a requester and the slave device may be referred to as a responder. The interconnect device may be referred to as a fabric. The master devices and/or slave devices may also be referred to as IP cores or IP blocks. While FIG. 2 shows three slaves and four masters, this is merely one example, and example embodiments of the inventive concepts are not limited to any particular number of slaves or masters.

The master devices 101, 102, 103 and 104 may generate requests to demand services from at least one of the slave devices 301, 302 and 303, respectively. The slave devices 301, 302 and 303 and the master devices 101, 102, 103 and 104 are coupled to the interconnect device 10 through respective channels. The interconnect device 10 may control request flows between the slave device 301, 302 and 303 and the master devices 101, 102, 103 and 104. For example, the interconnect device 10 may perform an arbitration operation between the requests based on priority information indicating the urgency of the respective requests.

The numbers of the master devices and the slave devices in FIG. 2 may be changed variously. The configurations of master devices 101, 102, 103 and 104 may be the same or different from each other depending on the operational characteristics of the respective master devices 101, 102, 103 and 104. Some of the master devices 101, 102, 103 and 104 and/or some of the slave devices 301, 302 and 303 may be omitted.

At least one of the master devices 101, 102, 103 and 104 may include a service level monitor and a request control circuit. FIG. 2 illustrates a non-limiting example that the first master device 101 includes a first service level monitor MON1 and a first request control circuit RCC1, the second master device 102 includes a second service level monitor MON2 and a second request control circuit RCC2, and the third master device 103 includes a third service level monitor MON3 and a third request control circuit RCC3. In contrast, at least one master device, for example, the fourth master device may not include a service level monitor but include only the fourth request control circuit RCC4.

Each service level monitor MONi (i=1,2,3) may provide a measured service level by measuring a service level with respect to the requests of the corresponding master device.

According to example embodiments, each service level monitor MONi may provide, as the measured service level, at least one of a measured latency and a measured bandwidth. The measured latency may be provided by measuring a latency of the corresponding master device where the latency indicates a delay from when the corresponding master device issues the request for service to when the requested service is completed. The measured bandwidth may be provided by measuring a bandwidth of the corresponding master device, where the bandwidth indicates a data amount that is serviced or transferred to the corresponding master device during a unit time.

Each request control circuit RCCi may control a power level of itself based on the measured service level. In some example embodiments, each request control circuit RCCi may control the power level by changing a maximum number of outstanding requests that the corresponding master device can issue.

As such, the master device according to example embodiments may reduce the power consumption of the master device and the system including the master device without performance degradation by controlling the power level of the request control circuit adaptively based on the measured service level.

Figure 3:
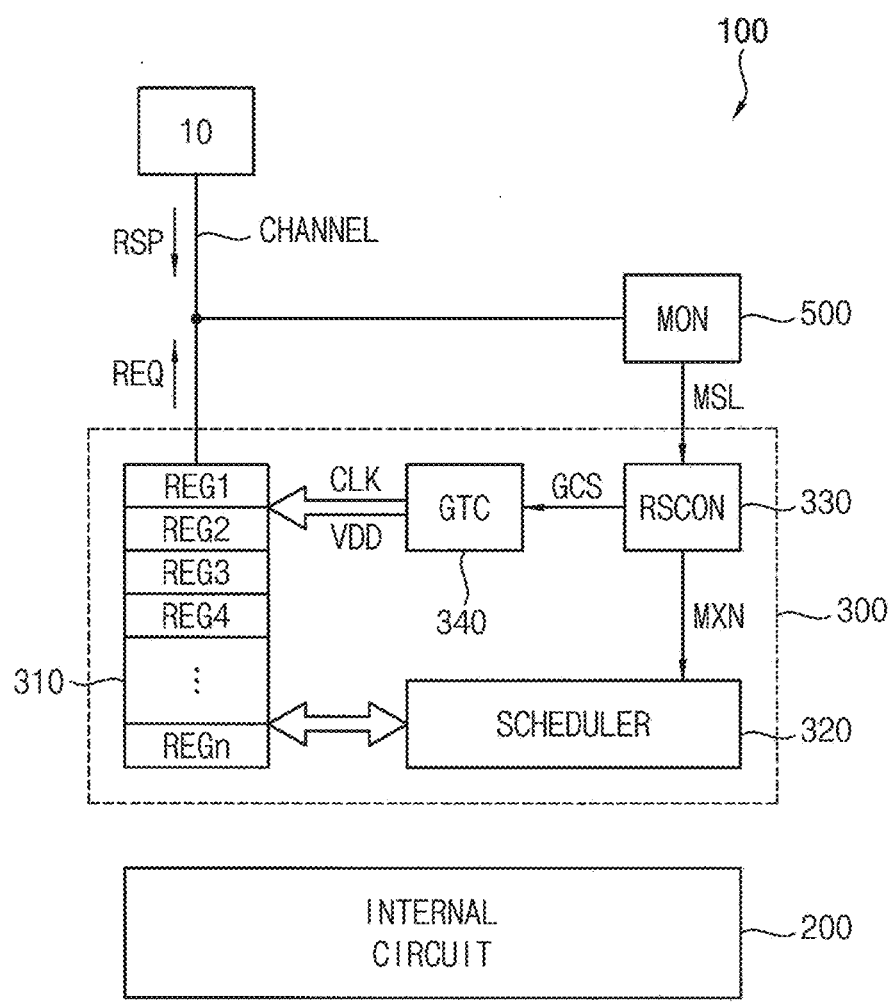
FIG. 3 is a block diagram illustrating a master device according to example embodiments.

FIG. 3 is a block diagram illustrating a master device according to example embodiments.

Referring to FIG. 3, a master device 100 may include an internal circuit 200, a request control circuit 300 and a service level monitor MON 500.

The internal circuit 200 may have various configurations according to a unique function of the corresponding master device. The service level monitor 500 may provide a measured service level MSL by measuring a service level with respect to the requests of the master device 100. The request control circuit 300 may issue a request REQ and receive a response RSP as a response to the request REQ through a channel connected to the interconnect device 10.

The request control circuit 300 may include a request queue 310, a scheduler 320, a resource controller RSCON 330 and a gate circuit GTC 340.

The request queue 310 may include a plurality of request storage units REG1~REGn configured to store the request, respectively. When a protocol supporting multiple outstanding transactions or multiple outstanding requests is adopted, the master device may include at least one request queue to store multiple requests. The request queue 310 may store the requests that are not issued yet or unfinished after issued.

The scheduler 320 may determine a service order or an issue order of the requests stored in the request queue 310 based on respective priorities of the requests. According to the determined order, the stored requests may be issued sequentially to the interconnect device 10.

The resource controller 330 may determine a maximum number MXN of outstanding requests that the master device 100 can issue. In some example embodiments, the resource controller 330 may generate a gate control signals GCS based on the maximum number MXN. The gate control signal GCS may include a plurality of switch control signals GCS1~GCSn as will be described below with reference to FIG. 4. The maximum number MXN of the outstanding requests may be provided to the scheduler 320, and the scheduler 320 may control the storage and the issue order of the requests corresponding to the maximum number MXN.

The gate circuit 340 may control an operation clock signal CLK and a power supply voltage VDD to be provided to the plurality of the request storage units REG1~REGn, respectively, based on the gate control signal GCS.

Figure 4:
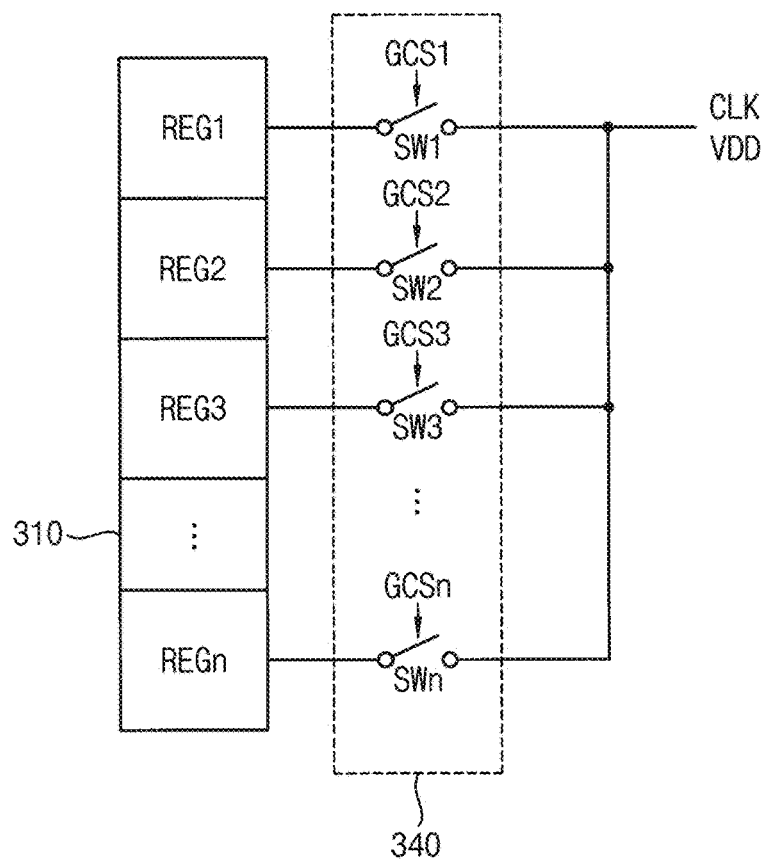
FIG. 4 is a diagram illustrating an example embodiment of a request control circuit to control a power level according to example embodiments.

FIG. 4 is a diagram illustrating an example embodiment of a request control circuit to control a power level according to example embodiments.

Referring to FIG. 4, a gate circuit 340 may include a plurality of switches SW1~SWn configured to gate an operation clock signal CLK and a power supply voltage VDD provided to a plurality of request storage units REG1~REGn included in a request queue 310, respectively.

Referring to FIGS. 3 and 4, the resource controller 330 may generate a plurality of switch control signals GCS1~GCSn to control switching operations of the plurality of switches SW1~SWn, respectively. The plurality of switches SW1~SWn may be turned on or off in response to activation or deactivation of a corresponding one of the plurality of switch control signals GCS1~GCSn.

The resource controller 330 may change a number of activated switch control signals among the plurality of switch control signals GCS1~GCSn based on the measured service level MSL provided from the service level monitor 500.

When each switch control signal GCSi (i=1~n) is activated, the corresponding switch SWi is turned on to transfer the operation clock signal CLK and the power supply voltage VDD to the corresponding request storage unit REGi and thus the corresponding request storage unit REGi may be enabled. In contrast, when each switch control signal GCSi is deactivated, the corresponding switch SWi is turned off to block the operation clock signal CLK and the power supply voltage VDD to the corresponding request storage unit REGi and thus the corresponding request storage unit REGi may be disabled.

The resource controller 330 may, as the measured service level MSL increases, decrease a number of the switch control signals that are activated such that a number of the request storage units receiving the operation clock signal CLK and the power supply voltage VDD may be decreased. In other words, as the measured service level MSL increases, a number of the enabled request storage units among the plurality of request storage units REG1~REGn may be decreased. As a result, the maximum number MXN of the outstanding requests may be decreased as the measured service level MSL increases.

Figure 5A:
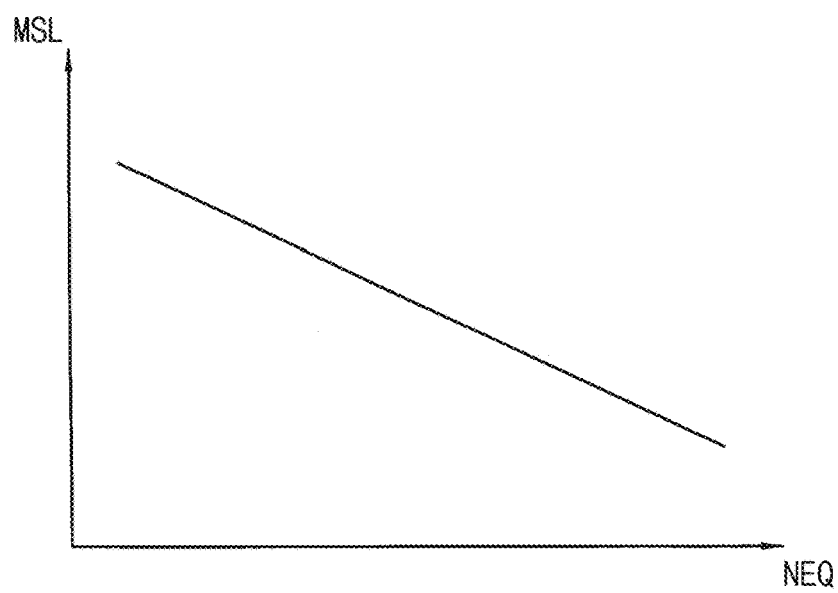

FIGS. 5A and 5B are diagrams for describing an example embodiment of controlling a power level according to example embodiments.

Referring to FIG. 5A, according to example embodiments, the number NEQ of the enabled request storage units among the plurality of request storage units REG1~REGn may be decreased as the measured service level MSL increases.

FIG. 5B illustrates first through fourth cases CS1~CS4 that first through fourth master devices MST1~MST4 perform transactions with first through fourth slave devices SLV1~SLV4, respectively. Each master device may issue a request REQ to demand services from the corresponding slave device and receive a response RSP for services from the corresponding slave device.

The first through fourth master devices MST1~MST4 may include first through fourth request queues RQ1~RQ4, respectively. It is assumed that the first through fourth request queues RQ1~RQ4 include the same number of request storage units. In FIG. 5B, the disabled request storage units are hatched.

The interconnect device 10 may include various components such as a switch circuit SWT, a converter CNV, and so on. The latency may be increased if the transaction passes through such components.

According to example embodiments, the number of the enabled request storage units may be increased as the latency increases, so as to decrease the latency. In contrast, the number of the enabled request storage units may be decreased as the latency decreases, so as to increase the latency and reduce the power consumption.

The first, second and third master devices MST1, MST2 and MST3 may correspond to the master device adopting the method of controlling a master device according to example embodiments.

In the first case CS1, there is no component through which the transaction between the first master device MST1 and the first slave device SLV1 passes. The latency is relatively short, and thus the number of the enabled request storage units may be relatively small.

In the second case CS2, there exists the component SWT through which the transaction between the second master device MST2 and the second slave device SLV2 passes. The latency of the second case CS2 is increased in comparison with the first case CS1, and thus the number of the enabled request storage units may be increased more than the first case CS1.

In the third case CS3, there exist the more component SWT and CNV through which the transaction between the third master device MST3 and the third slave device SLV3 passes. The latency of the third case is increased in comparison with the second case CS2, and thus the number of the enabled request storage units may be increased more than the second case CS2.

The fourth master device MST4 may correspond to the master device that does not adopt the method of controlling a master device according to example embodiments.

The latency of the fourth case CS4 may be the same as the first case CS1, but all of the request storage units of the fourth master device MST4 are enabled regardless of the latency. Accordingly the latency is decreased too much, that is, the service requirement level is increased too much, and thus the power consumption may be increased more than necessary.

As such, the master device and the method of controlling a master device according to example embodiments may reduce the power consumption of the master device and the system including the master device without performance degradation by controlling the power level of the request control circuit adaptively based on the measured service level.

Figure 6A:
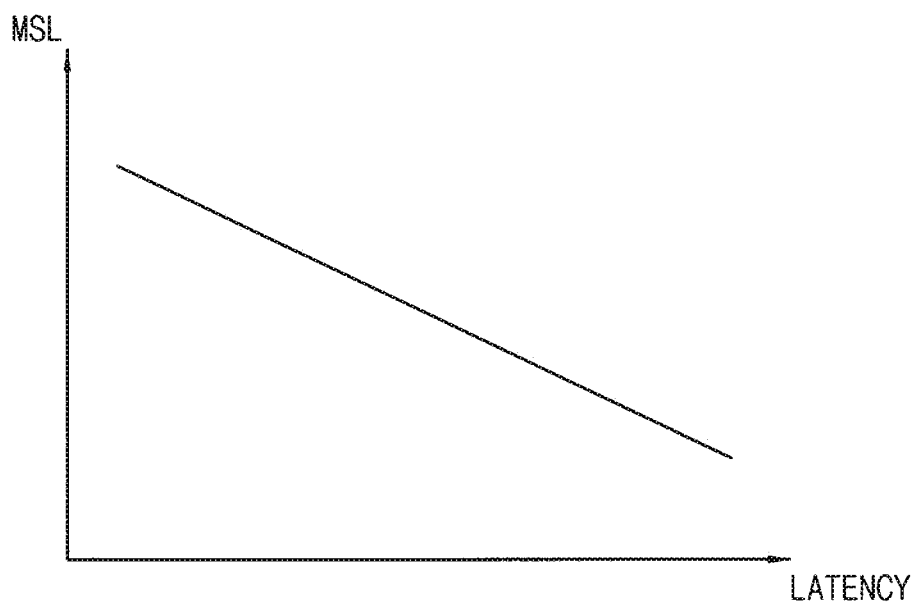
FIGS. 6A and 6B are diagrams illustrating relations between a measured service level and various service levels.
Figure 6B:
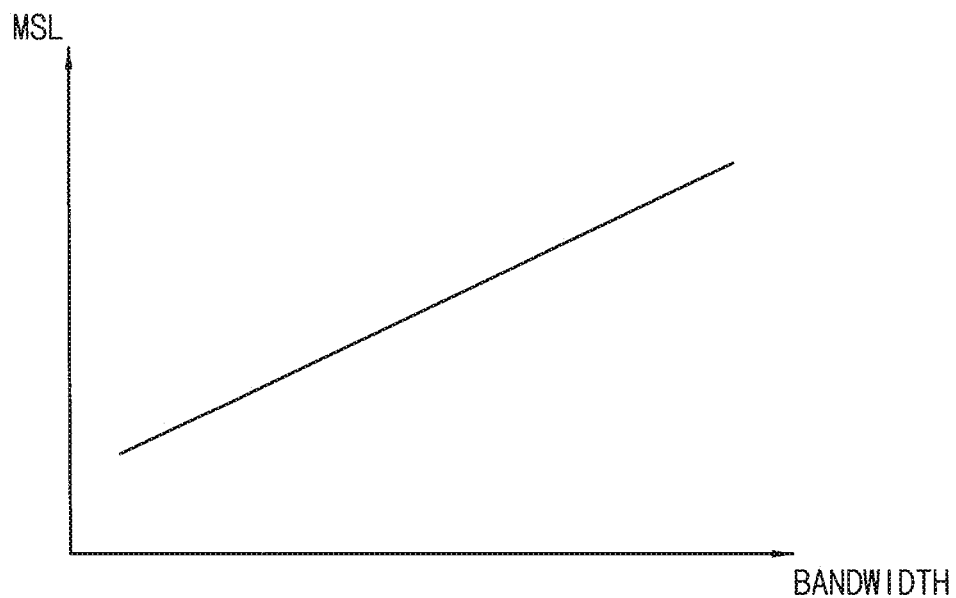

FIGS. 6A and 6B are diagrams illustrating relations between a measured service level and various service levels.

As illustrated in FIG. 6A, the measured service level MSL may be decreased as the latency increases. The longer latency may indicate that the services may not be provided in proper time, and thus the measured service level MSL may be in inverse proportion to the latency.

In contrast, as illustrated in FIG. 6B, the measured service level MSL may be increased as the bandwidth increases. The higher bandwidth may indicate that the amount of the serviced data is sufficient, and thus the measured service level MSL may be in proportion to the bandwidth.

Figure 7:
FIG. 7 is a diagram illustrating an example format of a request stored in a request queue.

FIG. 7 is a diagram illustrating an example format of a request stored in a request queue.

Referring to FIG. 7, a respective request REQ stored in the request queue may include a master identifier MID indicating the master device that issued the request REQ, a request identifier AxID for distinguishing the request REQ from the other requests from the same master device, an address-command ADD-COM representing the contents of the request REQ, and a priority AxQ of the request REQ. The priority AxQ may be transferred within the interconnect device and used for arbitration of the competing requests.

Figure 8:
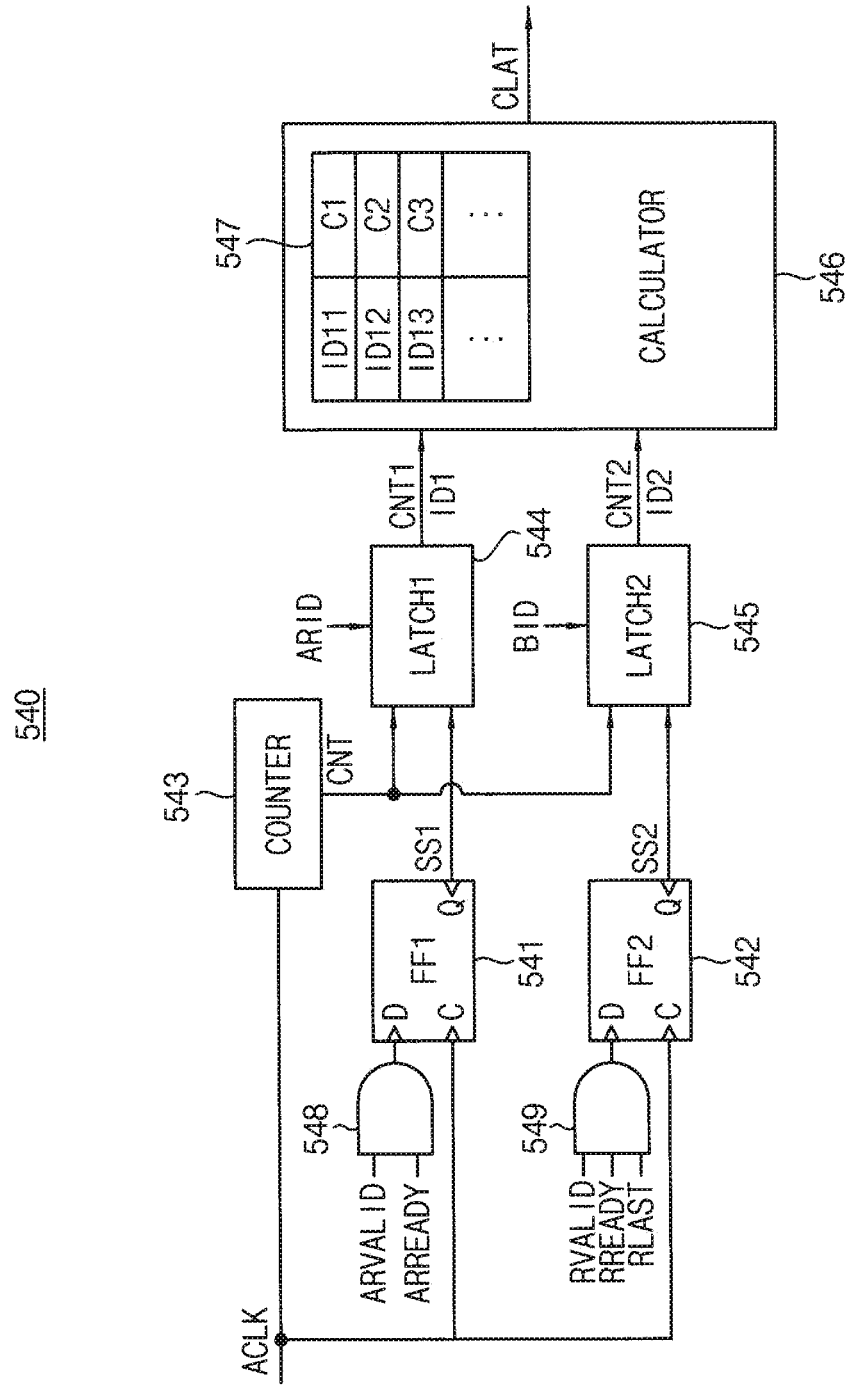
FIG. 8 is a block diagram illustrating an example embodiment of a service level monitor included in a master device according to example embodiments.

FIG. 8 is a block diagram illustrating an example embodiment of a service level monitor included in a master device according to example embodiments. FIG. 8 illustrates a latency detector configured to provide a current latency as the above-described measured service level MSL.

Referring to FIG. 8, a latency detector 540 may include a first flip-flop (FF1) 541, a second flip-flop (FF2) 542, a counter 543, a first latch (LATCH1) 544, a second latch (LATCH2) 545, a calculator 546, a first logic gate 548 and a second logic gate 549.

For example, the first logic gate 548 may be implemented as an AND gate that performs an AND operation on a request valid signal ARVALID and a request ready signal ARREADY to output an operation result. The output of the first gate 548 is input to a data terminal D of the first flip-flop 541 and a global clock signal ACLK is input to a clock terminal C of the first flip-flop 541. The first flip-flop 541 samples the output of the first gate 548 in response to a rising edge of the global clock signal ACLK to output a first sampling signal SS1 though an output terminal Q.

For example, the second logic gate 549 may be implemented as an AND gate that performs an AND operation on a service valid signal RVALID, a service ready signal RREADY and a service done signal RLAST to output an operation result. The output of the second gate 549 is input to a data terminal D of the second flip-flop 542 and the global clock signal ACLK is input to a clock terminal C of the second flip-flop 542. The second flip-flop 541 samples the output of the second gate 549 in response to a rising edge of the global clock signal ACLK to output a second sampling signal SS2 though an output terminal Q.

The request valid signal ARVALID, the request ready signal ARREADY, the service valid signal RVALID, the service ready signal RREADY and the service done signal RLAST may be included in the channel signals between the master devices and the interconnect device.

The counter 543 counts a cycle number of the global clock signal ACLK to provide a count signal CNT.

The first latch 544 latches the count signal CNT in response to a rising edge of the first sampling signal SS1 to provide a start count signal CNT1. The first latch 544 may receive a first identification signal ARID associated the request signals ARVALID and ARREADY to provide a first identification code ID1.

The second latch 545 latches the count signal CNT in response to a rising edge of the second sampling signal SS2 to provide an end count signal CNT2. The second latch 545 may receive a second identification signal BID associated the service signals RVALID, RREADY and RLAST to provide a second identification code ID2.

The calculator 546 generates a current latency CLAT based on the start count signal CNT1 and the end count signal CNT2. When the system 1000 adopts a protocol supporting multiple outstanding transactions between the master devices, the interconnect device and the slave devices, the identification signals ARID and BID may be used to determine whether the request signals ARVALID and ARREADY are associated with the same transaction as the service signals RVALID, RREADY and RLAST.

Whenever the start count signal CNT1 and the first identification code ID1 are input, the calculator 546 may upgrade a mapping table 547 to store values ID11, ID12 and ID13 of the first identification code ID1 and corresponding count values C1, C2 and C3 of the start count signal CNT1. When the end count signal CNT2 and the second identification code ID2 are input, the calculator 546 extracts one of the count values C1, C2 and C3 from the mapping table 547 by comparing the value of the second identification signal ID2 and the previously stored values ID11, ID12 and ID13 of the first identification signal ID1.

The extracted value represents a service request timing point and the value of the end count signal CNT2 represents a request done timing point. For example, the service request timing point may correspond to the time at which the service was requested and the request done timing point may correspond to the time at which the request service completed. The calculator 546 may generate the current latency CLAT by calculating the difference between the extracted value representing the service request timing point and the value representing the issue done timing point.

The current latency CLAT obtained as such may be provided as the measured service level for the method of controlling a master device according to example embodiments.

Figure 9:
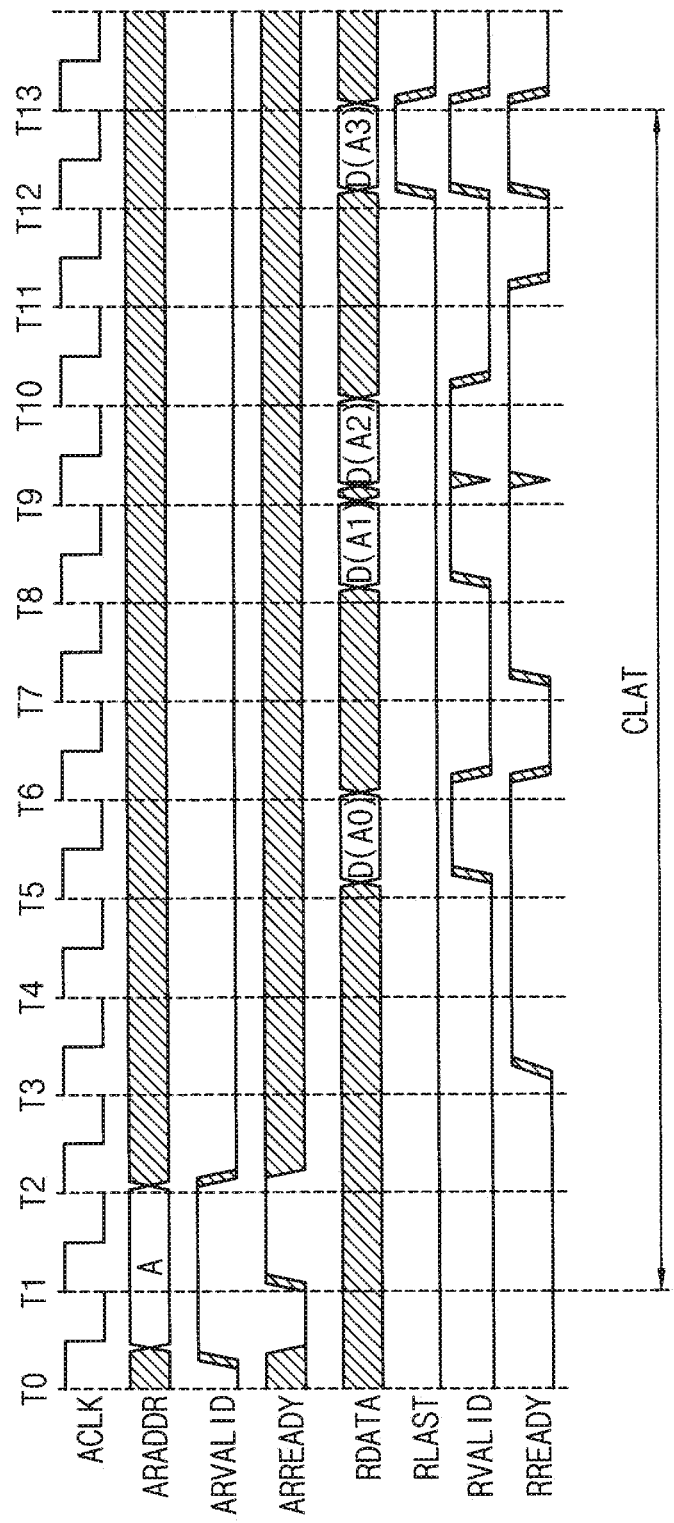
FIG. 9 is a timing diagram illustrating an example transaction performed by a system according to example embodiments and a current latency detected by the latency detector of FIG. 8.

FIG. 9 is a timing diagram illustrating an example transaction performed by a system according to example embodiments and a current latency detected by the latency detector of FIG. 8.

FIG. 9 illustrates an example of a read transaction according to an advanced extensible interface (AXI) protocol. The AXI protocol adopts a handshake scheme using valid signals ARVALID and RVALID and ready signals ARREADY and RREADY.

According to the handshake scheme, if a first one of a master interface and a slave interface transfers a signal to a second one of the master interface and the slave interface, the first one activates a valid signal, and then the second one activates a ready signal corresponding to the valid signal when the second one is ready to receive the signal. Sampling of signals is performed in response to rising edges of a global clock signal ACLK at both of the master interface and the slave interface. In other words, a valid signal transfer is fulfilled when both of the valid signal and the ready signal are activated at the same rising edge of the global clock signal ACLK.

As illustrated in FIG. 9, the master device 100 corresponding to the master interface activates a request valid signal ARVALID when the master device transfers a signal and the interconnect device 10 corresponding to the slave interface activates a request ready signal ARREADY when the interconnect device 10 is ready to receive the signal from the master device 100. In the same way, the interconnect device 10 activates a service valid signal RVALID when the interconnect device 10 transfers a signal and the master device 100 activates a service ready signal RREADY when the master device is ready to receive the signal from the interconnect device 10.

The rising edges of the global clock signal ACLK are represented as timing points T0 through T13 in FIG. 9. The master interface 100 corresponding to the master interface transfers a read request signal ARADDR to the interconnect device 10 corresponding to the slave interface by activating the request valid signal ARVALID corresponding to a service request signal. The read request signal ARADDR is transferred successfully at the timing point T2 when both of the request valid signal ARVALID and the request ready signal ARREADY are activated. The master device 100 may determine the timing point T1 as a service request timing point based on the request valid signal ARVALID regardless of the request ready signal, that is, regardless of the success of the valid signal transfer.

As a response to the read request, data D(A0), D(A1), D(A2) and D(A3) of a burst type are transferred from the interconnect device 10 to the master device 100. The data D(A0), D(A1), D(A2) and D(A3) are transferred successfully at timing points T6, T9, T10 and T13, respectively, when both of the service valid signal RVALID and the service ready signal RREADY are activated. The interconnect device 10 activates a service done signal RLAST with transferring the last data D(A3), and the timing point T13 is determined as a service done timing point.

As such, the latency detector 540 of FIG. 8 may detect the current latency CLAT based on the request signals ARVALID and ARREADY and the service signals RVALID, RREADY and RLAST among the channel signals CHN between the master device 100 and the interconnect device 10.

Figure 10:
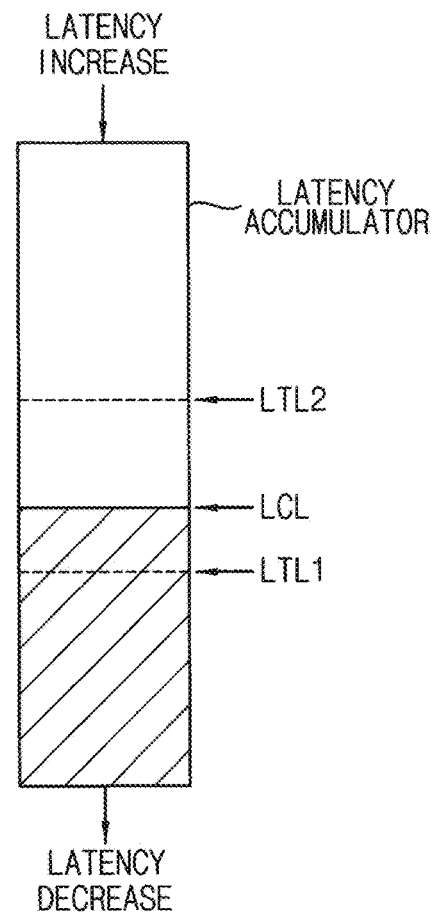
FIG. 10 is a diagram illustrating an accumulator model for detecting a latency according to example embodiments.

FIG. 10 is a diagram illustrating an accumulator model for detecting a latency according to example embodiments.

Depending on the operational characteristic of the master device, the service requirement level may be represented as a latency. The latency may be a delay from when the master device issues the request for service to when the requested service has completed. For example, the latency may be represented as a cycle number of a clock signal.

A latency state of an accumulator in the master device is illustrated using oblique lines in FIG. 10 and the latency state may be represented as a current latency level LCL. The current latency level LCL is increased when the latency of the accumulator is increased and the current latency level LCL is decreased when the latency of the accumulator is decreased.

When the current latency level LCL is higher than a target latency level (e.g., LTL1), the latency may be decreased by increasing the maximum number MXN of the outstanding requests or the number NEQ of the enabled request storage units. In contrast, when the current latency level LCL is lower than a target latency level (e.g., LTL2), the latency may be increased and the power consumption may be reduced by decreasing the maximum number MXN of the outstanding requests or the number NEQ of the enabled request storage units.

Figure 11:
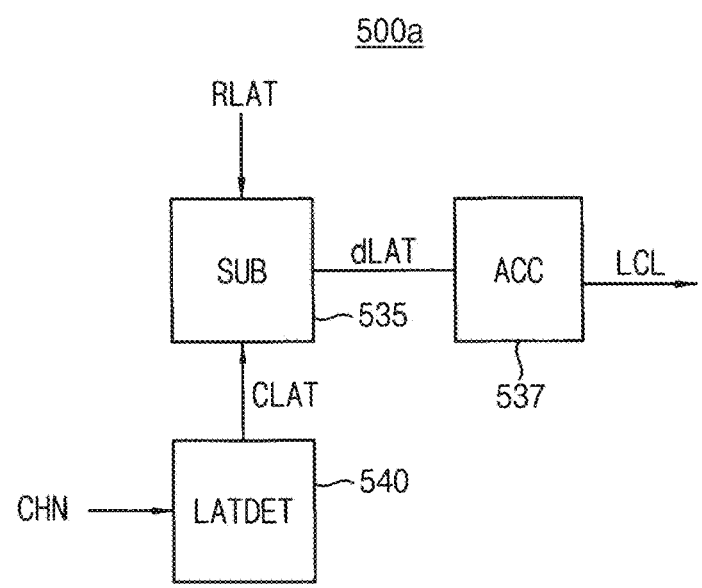
FIG. 11 is a block diagram illustrating an example embodiment of a service level monitor using the accumulator model of FIG. 10.

FIG. 11 is a block diagram illustrating an example embodiment of a service level monitor using the accumulator model of FIG. 10.

The above-described service level monitor may be implemented as a latency monitor 500a as illustrated in FIG. 11.

Referring to FIG. 11, the latency monitor 500a may generate a current latency level LCL by accumulating the latency of the corresponding master device. The latency monitor 500a may include a latency detector (LATDET) 540, a subtractor (SUB) 535 and an accumulator (ACC) 537.

The latency detector 540 may generate a current latency CLAT based on channel signals CHN transmitted between the corresponding master device and the interconnect device 10 as described with reference to FIG. 8. The subtractor 535 may calculate a difference between a reference latency RLAT and the current latency CLAT to generate a latency difference value dLAT. The accumulator 537 may accumulate the latency difference value dLAT to generate the current latency level LCL.

The current latency level LCL obtained as such may be provided as the measured service level for the method of controlling a master device according to example embodiments.

Figure 12:
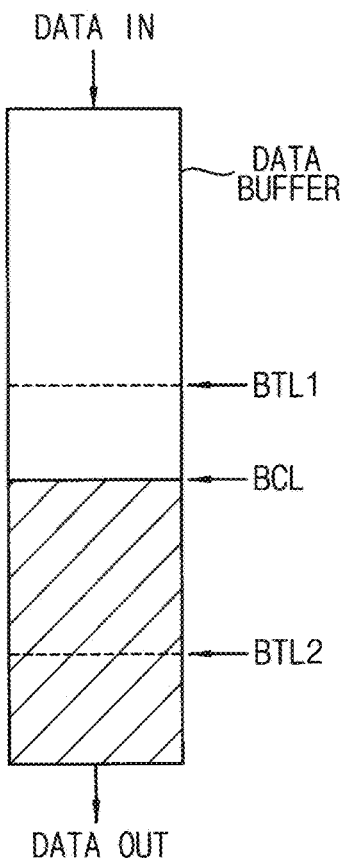
FIG. 12 is a diagram illustrating a buffer model for detecting a bandwidth according to example embodiments.

FIG. 12 is a diagram illustrating a buffer model for detecting a bandwidth according to example embodiments.

Depending on the operational characteristic of the master device, the service requirement level may be represented as a bandwidth. The bandwidth is a data amount that is serviced or transferred during a unit time. For example, data may be serviced to the master device from the slave device such as a memory controller that is coupled to the master device through the interconnect device. The master device may store the serviced data in a data buffer to perform its own function based on the stored data.

A data occupancy state of the data buffer in the master device is illustrated using oblique lines in FIG. 11. The data occupancy state may be represented as a current bandwidth level BCL. The current bandwidth level BCL is increased when data are serviced (DATA IN) from the slave device and the current bandwidth level BCL is decreased when the stored data are consumed (DATA OUT) by the master device.

Figure 13:
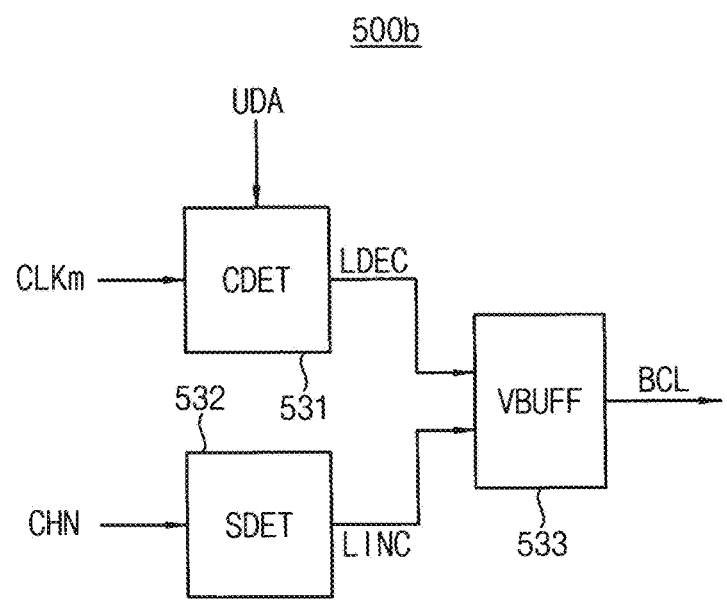
FIG. 13 is a block diagram illustrating an example embodiment of a service level monitor using the buffer model of FIG. 12.

FIG. 13 is a block diagram illustrating an example embodiment of a service level monitor using the buffer model of FIG. 12.

The above-described service level monitor may be implemented as a bandwidth monitor 500b as illustrated in FIG. 13.

Referring to FIG. 13, the bandwidth monitor 500b may generate a current bandwidth level BCL by detecting a bandwidth of the corresponding master device in realtime. The bandwidth monitor 500b may include a consumed data detector (CDET) 531, a serviced data detector (SDET) 532 and a virtual buffer (VBUFF) 533.

For example, the consumed data detector 531 may generate a level decrease signal LDEC based on an operational clock signal CLKm of the corresponding master device and a unit amount UDA of consumed data. For example, the level decrease signal LDEC may indicate how much data has been consumed by the corresponding master device during a given period of time. The serviced data detector 532 may generate a level increase signal LINC based on channel signals CHN transferred between the corresponding master device and the interconnect device 10. For example, the level increase signal LINC may indicate how many transactions are completed for the corresponding master device during a given period of time. The virtual buffer 533 may generate the current bandwidth level BCL based on the level decrease signal LDEC and the level increase signal LINC.

The current bandwidth level BCL obtained as such may be provided as the measured service level for the method of controlling a master device according to example embodiments.

Figure 14:
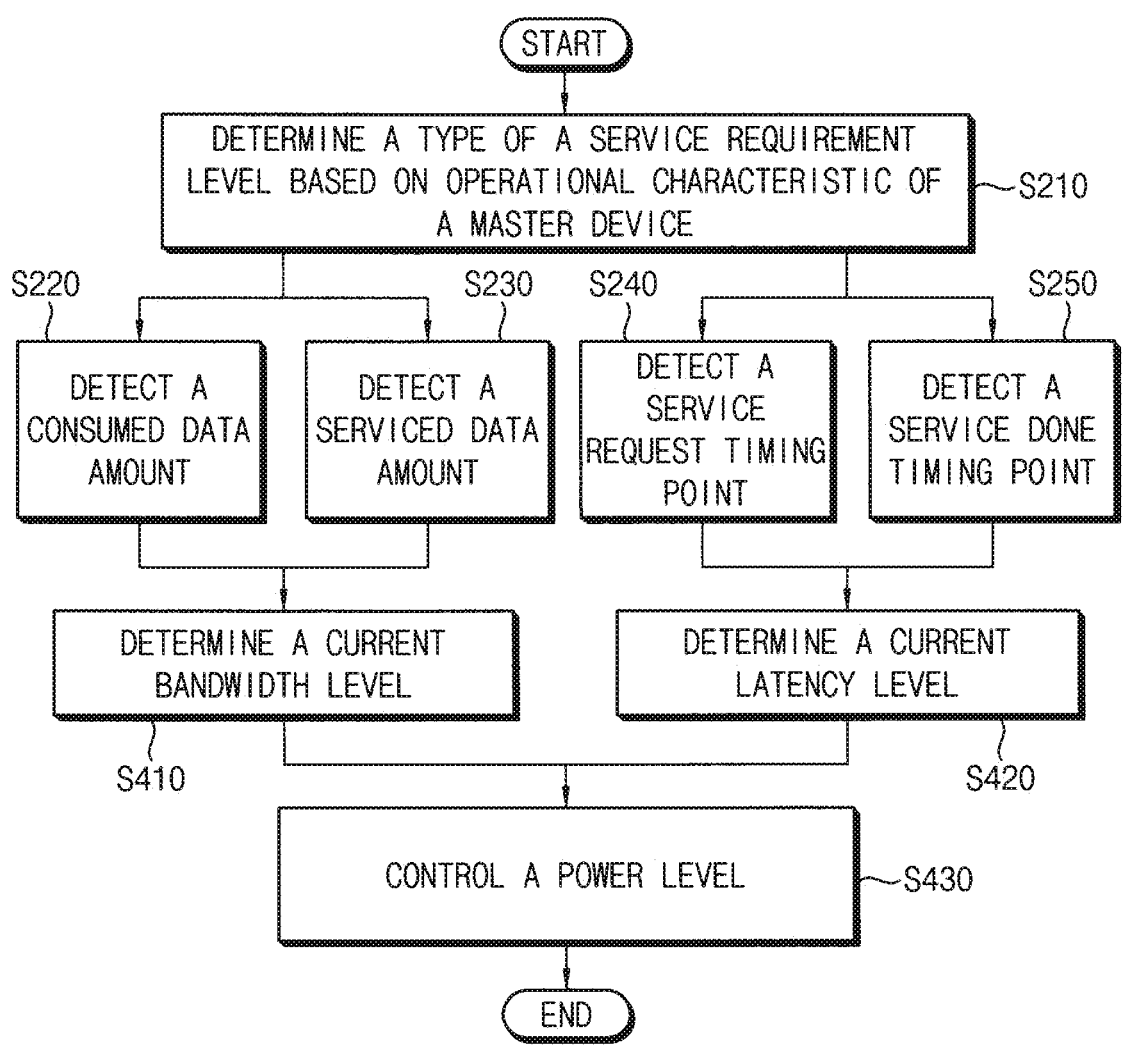
FIG. 14 is a flow chart illustrating a method of controlling a master device according to example embodiments.

FIG. 14 is a flow chart illustrating a method of controlling a master device according to example embodiments.

Referring to FIG. 14, in operation S210, a type of a service requirement level is determined among a bandwidth and a latency based on operational characteristic of a master device. Based on the determined type of the service requirement level, at least one of the above-described bandwidth and latency monitors may be included in the service level monitor or enabled in response to the enable signals.

For example, when the bandwidth monitor is determined as an implemented type of the service requirement, in operations S230 and S240, the above-described bandwidth monitor detects a consumed data amount and detects a serviced data amount. Thereafter, in operation S410, the band-width monitor determines a current bandwidth level based on the consumed data amount and the serviced data amount.

When the latency monitor is determined as an implemented type of the service requirement, in operations S240 and S250, the above-described latency monitor detects a service request timing point and detects a service done timing point. Thereafter, in operation S420, the latency monitor determines a current latency level based on the service request timing point and the service done timing point.

The above-described request control circuit may control the power level of itself based on at least one of the current bandwidth level and the current latency level.

As such, the appropriate monitors for detecting the service requirement level may be determined and the power consumption may be reduced efficiently.

The master device or the master intellectual property (IP) may be divided into a hard realtime IP, a soft realtime IP and a best effort IP depending on the type or the operational characteristic of the master IP.

The hard realtime IP may be an IP such as a display device that consumes data steadily and thus requires a necessary bandwidth. An underrun of a data buffer in the hard realtime IP may be caused if the necessary bandwidth is not satisfied. The hard realtime IP buffers the serviced data sufficiently in the data buffer if the necessary bandwidth is satisfied and controls the request flow itself such that the hard realtime IP issues the request according to the amount of the consumed data.

To reduce manufacturing cost, an external modem chip may share a memory in the SOC. Such an external modem chip may not operate normally if an average latency requirement level is not satisfied. It may be difficult to determine and fix the average latency requirement level because the type of the modem chip varies.

The soft realtime IP may be an IP such as a video codec that requires an average operation time. The video codec may have a frame rate such as 30 or 60 frames per second and may require an average decode/encode time. The bandwidth requirement level of the video codec may be changed according to respective frames and the video codec may require an average encoding time and/or an average decoding time. The video codec tends to precede the encoding/decoding of the next frame as soon as possible if the request flow is not controlled but the issue of the requests is limited due to dependency between the previously and currently processed data. Thus the operation speed of the video codec may satisfy the determined frame rate if the required bandwidth and/or latency are secured, but the operation speed of the codec may be sharply decreased if the latency becomes greater than a threshold value.

The best effort IP may be an IP such as two-dimensional or a three-dimensional graphics engine that issues requests endlessly if the request flow is not controlled and thus request flow control is needed in the best effort IP. It is desirable to support maximum service requirement levels of the best effort IP if the other IP of higher priority than the best effort IP is not in the urgent state. If the other IP is in the urgent state, the request flow from the best effort IP is limited so that the other IP of the higher priority may exit from the urgent state.

The latency-oriented IP such as a central processing unit (CPU) may have a variable bandwidth requirement level depending on the situation but its performance is directly influenced by an average latency. The request flow of the latency-oriented IP needs to be controlled based on the latency because the average bandwidth requirement level may not be defined.

The measured service level for the method of controlling a master device according to example embodiments may be determined properly according to such characteristics of the master device by measuring the latency and/or the bandwidth.

Figure 15:
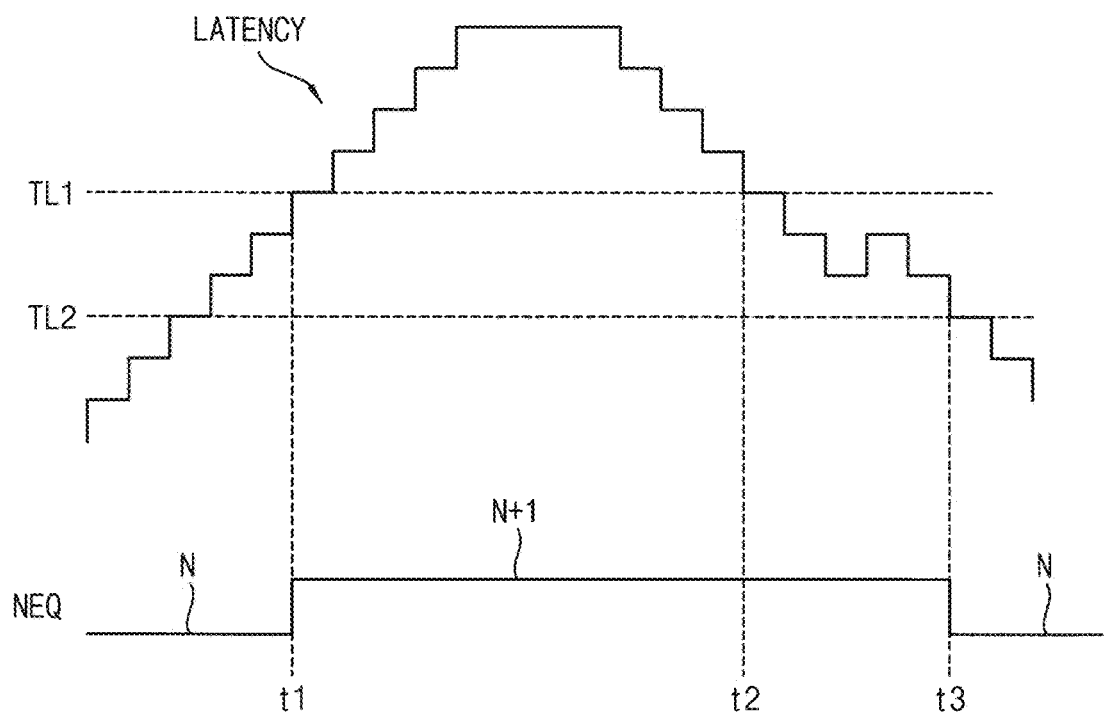
FIG. 15 is a diagram illustrating an example embodiment of controlling a power level based on a measured service level.

FIG. 15 is a diagram illustrating an example embodiment of controlling a power level based on a measured service level.

Referring to FIG. 15, an operation of a master device may be controlled by hysteresis scheme such that a criteria for increasing a number NEQ of enabled request storage units may be different from a criteria for decreasing the number NEQ.

Above described measured the number NEQ of the enabled request storage units may be decreased when the measured service level MSL increases higher than a first reference level. For example, as illustrated in FIG. 15, the number NEQ of the enabled request storage units may be decreased from N+1 to N where N is an integer when the measured latency decreases lower than a second reference TL2 at time point t3.

In contrast, the measured the number NEQ of the enabled request storage units may be increased when the measured service level MSL decreases lower than a second reference level. For example, as illustrated in FIG. 15, the number NEQ of the enabled request storage units may be increased from N to N+1 when the measured latency increases higher than a first reference TL1 at time point t1.

Because the measured service level MSL is in an inverse proportion to the latency, the first reference value of the measured service level MSL corresponds to the second reference latency TL2 and the second reference value of the measured service level MSL corresponds to the first reference latency TL1.

For the hysteresis scheme, the second reference value of the measured service level MSL may be set to be lower than the first reference value of the measured service level MSL. When the measured service level MSL corresponds to the measured latency as FIG. 15, the second reference latency TL2 may be set to be lower than the first reference latency TL1.

Through such control of the number NEQ of the enabled request storage units by the hysteresis scheme, the frequent change of the number NEQ may be prevented and the power consumption may be reduced stably with securing the performance of the master device.

Figure 16:
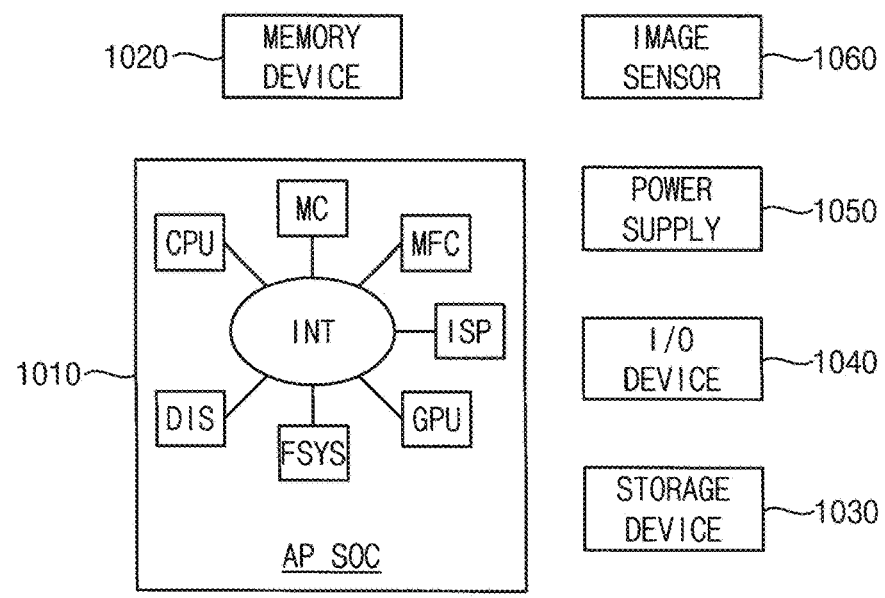
FIG. 16 is a block diagram illustrating a computing system according to example embodiments.

FIG. 16 is a block diagram illustrating a computing system according to example embodiments.

Referring to FIG. 16, a computing system 2000 may include a system on chip (SOC) 1010, a memory device 1020, a storage device 1030, an input/output (I/O) device 1040, a power supply 1050 and an image sensor 1060. The computing system 2000 may be any computing system including at least one SOC. Although it is not illustrated in FIG. 16, the computing system 2000 may further include ports that communicate with a video card, a sound card, a memory card, a USB device, or other electronic devices.

The SOC 1010 may be an application processor (AP) SOC including an interconnect device INT and a plurality of intellectual properties or function blocks coupled to the interconnect device INT. For example, as illustrated in FIG. 16, the intellectual properties may include a memory controller MC, a central processing unit CPU, a display controller DIS, a file system block FSYS, a graphic processing unit GPU, an image signal processor ISP, a multi-format codec block MFC, etc. For example, the memory controller MC may correspond to the above-described slave device and other intellectual properties may correspond to the above-described master devices that use the memory controller MC as a common resource. At least one of the master devices may be implemented to perform the method of controlling a master device according to example embodiments as described with reference to FIGS. 1 through 15.

The SOC 1010 may communicate with the memory device 1020, the storage device 1030, the input/output device 1040 and the image sensor 1060 via a bus such as an address bus, a control bus, and/or a data bus. In some example embodiments, the SOC 1010 may be coupled to an extended bus, such as a peripheral component interconnection (PCI) bus.

The memory device 1020 may store data for operating the computing system 2000. For example, the memory device 1020 may be implemented with a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, and/or a magnetic random access memory (MRAM) device. The storage device 1030 may include a solid state drive (SSD), a hard disk drive (HDD), a CD-ROM, etc. The input/output device 1040 may include an input device (e.g., a keyboard, a keypad, a mouse, etc.) and an output device (e.g., a printer, a display device, etc.). The power supply 1050 supplies operation voltages for the computing system 2000.

The image sensor 1060 may communicate with the SOC 1010 via the buses or other communication links. As described above, the image sensor 1060 may be integrated with the SOC 1010 in one chip, or the image sensor 1060 and the SOC 1010 may be implemented as separate chips.

The components in the computing system 2000 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

Example embodiments of the inventive concepts may be applied to any master device requiring power consumption and systems including the master device. For example, the inventive concepts may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The elements of the systems described herein such as the slave device, interconnect device and the master device, described above, including the request control circuit 300 and service level monitor 500, may be implemented in processing circuitry such as hardware including logic circuits; a hardware/software combination such as a processor executing software; or a combination thereof and memory. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc., and the memory may include various volatile or non-volatile memory devices configured to store information, such as the request queue 310.

The processing circuitry may be special purpose processing circuitry that improves the functioning of the system by controlling the power level of the request control circuit without reducing the frequency of the operation clock signal or the voltage level of the power supply voltage. Accordingly, power consumption of the master device may be reduced while the performance of the master device is not affected.

The foregoing is illustrative of example embodiments and is not to be construed as limiting thereof. Although a few example embodiments have been described, those skilled in the art will readily appreciate that many modifications are possible in the example embodiments without materially departing from the present inventive concepts.

What is claimed is:

1. A method of controlling a master device, the master device configured to communicate with a slave device via an interconnect device, the master device including a request control circuit having a request queue therein, the method comprising:
storing requests in respective ones of a plurality of request storage elements within the request queue, the requests each demanding services from the slave device on behalf of the master device;
sequentially issuing the requests to the slave device via the interconnect device from enabled request storage elements one storage element at a time among the plurality of request storage elements within the request queue;
measuring a service level with respect to the requests; and
controlling a power level of the request control circuit by changing, based on the service level, a number of the plurality of request storage elements within respective ones of request queues that are disabled request storage elements blocked from storing the requests to adjust a maximum number of outstanding requests sequentially issuable by the master device.

2. The method of claim 1, wherein the changing the maximum number of the outstanding requests comprises:
decreasing the maximum number of the outstanding requests as the service level increases by increasing the number of the disabled request storage elements and decreasing a number of the enabled request storage elements within respective ones of the request queues.

3. The method of claim 1, the changing the number of the disabled request storage elements comprises:
blocking transfer of an operation clock signal and a power supply voltage to the disabled request storage elements.

4. The method of claim 1, wherein the changing the number of the disabled request storage elements comprises:
increasing the number of the disabled request storage elements from N to N+1, in response to the service level being higher than a first reference value; and
decreasing the number of the disabled request storage elements from N+1 to N, in response to the service level being lower than a second reference value, wherein N is an integer.

5. The method of claim 4, wherein the second reference value is lower than the first reference value.

6. The method of claim 1, wherein controlling the power level of the request control circuit comprises:
decreasing a number of the request storage elements receiving an operation clock signal and a power supply voltage as the service level increases.

7. The method of claim 1, wherein the measuring the service level comprises:
measuring a latency corresponding to a delay from when the master device issues one of the requests to when a respective one of services is completed.

8. The method of claim 1, wherein the measuring the service level comprises:
measuring a bandwidth by measuring a data amount that is serviced or transferred to the master device during a unit time.

9. The method of claim 1, wherein the measuring the service level comprises:
measuring at least one of a latency of the master device and a bandwidth of the master device, the latency corresponding to a delay from when the master device issues a respective one of the requests to when a respective one of the services is completed, and the bandwidth corresponding to a data amount that is serviced or transferred to the master device during a unit time.

10. A master device connected to a slave device through an interconnect device, the master device comprising:
a memory including a plurality of request storage elements forming a request queue, the request queue configured to store requests in respective ones of the plurality of request storage elements therein, the requests each demanding services from the slave device on behalf of the master device; and
processing circuitry configured to,
sequentially issuing the requests to the slave device via the interconnect device from enabled request storage elements one storage element at a time among the plurality of request storage elements within the request queue to request the services from the slave device,
measure a service level with respect to the requests, and
control a power level associated with transmission of the requests by changing, based on the service level, a number of the plurality of request storage elements within respective ones of request queues that are disabled request storage elements blocked from storing the requests to adjust a maximum number of outstanding requests sequentially issuable by the master device.

11. The master device of claim 10, further comprising:
a gate circuit including a plurality of switches configured to gate an operation clock signal and a power supply voltage such that the gate circuit blocks transfer of the operation clock signal and the power supply voltage to the disabled request storage elements of the plurality of request storage elements.

12. The master device of claim 11, wherein the processing circuitry is configured to,
change a number of the disabled request storage elements by setting switch control signals based on the service level.

13. The master device of claim 12, wherein the processing circuitry is configured to,
activate ones of the switch control signals to instruct respective ones of the plurality of switches to allow transfer of the operation clock signal and the power supply voltage to enabled request storage elements, and
deactivate ones of the switch control signals to instruct respective ones of the plurality of switches to block transfer of the operation clock signal and the power supply voltage to the disabled request storage elements.

14. The master device of claim 12, wherein the processing circuitry is configured to, decrease a number of the plurality of switches that are activated to decrease a number of the request storage elements receiving the operation clock signal and the power supply voltage in response to the service level increasing.

15. The master device of claim 10, wherein the processing circuitry is configured to detect a latency level based on channel signals transferred between the master device and the interconnect device.

16. The master device of claim 15, wherein the processing circuitry is configured to,
calculate a difference between a reference latency and a current latency to generate a latency difference value,
accumulate the latency difference value to detect the latency level.

17. The master device of claim 10, wherein the processing circuitry is configured to detect a bandwidth level of the master device in realtime.

18. A system comprising:
- at least one slave device;
- a plurality of master devices each configured to generate requests to demand services from the slave device on behalf of a respective one of the plurality of master devices, at least one of the plurality of master devices including,
  - a request queue configured to store the requests in respective ones of a plurality of request storage elements therein, and
  - processing circuitry configured to sequentially issue the requests to the slave device via an interconnect device from enabled request storage elements one storage element at a time among the plurality of request storage elements within the request queue, to measure a service level of the requests of the at least one of the plurality of master devices, and to control a power level associated with transmission of the requests by changing, based on the service level, a number of the plurality of request storage elements within respective ones of request queues that are disabled request storage elements blocked from storing the requests to adjust a maximum number of outstanding requests sequentially issuable by the master device; and
- the interconnect device coupled to the at least one slave device and the plurality of master devices through respective channels, the interconnect device configured to control a flow of the requests between the at least one slave device and the plurality of master devices.

* * * * *